United States Patent [19]
Judd et al.

[11] Patent Number: 6,118,612
[45] Date of Patent: Sep. 12, 2000

[54] DISK DRIVE SYNCHRONIZATION

[75] Inventors: Ian David Judd, Winchester; Norman Apperley, Eastleigh, both of United Kingdom

[73] Assignee: International Business Machines Corporation, Armonk, N.Y.

[21] Appl. No.: 08/935,157

[22] Filed: Sep. 22, 1997

Related U.S. Application Data

[63] Continuation of application No. 07/986,156, Dec. 3, 1992, abandoned.

[30] Foreign Application Priority Data

Dec. 5, 1991 [EP] European Pat. Off. .............. 91311325

[51] Int. Cl.[7] ..................................................... G11B 15/52
[52] U.S. Cl. ............................ 360/73.03; 360/69; 360/71
[58] Field of Search ............................. 360/73.02, 73.03, 360/48, 73.01, 47, 49, 50, 51, 15; 711/114, 115

[56] References Cited

U.S. PATENT DOCUMENTS

| | | | |
|---|---|---|---|
| 3,710,324 | 1/1973 | Cohen et al. | 710/40 |
| 3,893,178 | 7/1975 | Sordello | 360/73 |
| 4,368,512 | 1/1983 | Kyu et al. | 364/200 |
| 4,618,897 | 10/1986 | Johnson et al. | 360/15 |
| 4,675,864 | 6/1987 | Bliek et al. | 370/85 |
| 4,862,411 | 8/1989 | Dishon et al. | 360/15 X |
| 4,870,643 | 9/1989 | Bultman et al. | 360/73.02 X |
| 4,907,105 | 3/1990 | Kurzweil, Jr. | 360/73.02 |
| 5,237,466 | 8/1993 | Glaser et al. | 360/73.02 X |
| 5,491,593 | 2/1996 | Donaldson | 360/73.03 |
| 5,598,303 | 1/1997 | Jones et al. | 360/73.02 |
| 5,657,177 | 8/1997 | Shitara | 360/73.03 |

FOREIGN PATENT DOCUMENTS

| | | |
|---|---|---|
| 0163883 | 12/1985 | European Pat. Off. . |
| 0320107 | 6/1989 | European Pat. Off. . |

OTHER PUBLICATIONS

Microsoft Press, Computer Dictionary, p. 207, p. 257, 1997.
Patterson et al., "A Case for Redundant Arrays of Inexpensive Disks (RAID)", ACM SIGMOD Conference, Chicago, Illinois, Jun. 1–3, 1988.

*Primary Examiner*—Paul Loomis
*Assistant Examiner*—K. Wong
*Attorney, Agent, or Firm*—Matthew J. Bussan

[57] ABSTRACT

A spindle synchronization technique is described which is useful in a disk array subsystem comprising a plurality of disk drives (40,41,42,43) connected by means of serial links (25,26,27,28) to a disk drive controller (20). Data and command information is transmitted over the link in the form of multi-character frames, the flow of which is regulated by special ten bit protocol characters. A SYNC protocol character is defined which is used to synchronize the spindles of the disk drives. This SYNC character is issued by controller to selected ones of the drives over the same link used for the transmission of the command and data information. The SYNC character may be interleaved between the characters of frames being transmitted over the link.

14 Claims, 7 Drawing Sheets

DISK DRIVE SYNCHRONIZATION

This is a continuation of application Ser. No. 07/986,156 filed on Dec. 3, 1992, now abandoned.

FIELD OF THE INVENTION

This invention relates to the field of disk drives and more particularly to a technique for synchronizing the rotations of the spindle(s) of one or more disk drives to an external source.

BACKGROUND OF THE INVENTION

In recent years, there has been a growth in interest in disk drive arrays which consist of a number of disk drives connectable to a using system via one or more controller elements which control the transfer of data to and from the disk drives. A disk array is designed to provide high capacity data storage, high reliability and high data transfer rates to and from the using system.

A number of different array schemes have been proposed. A paper entitled 'A Case for Redundant Arrays of Inexpensive Disks (RAID)' (ACM SIGMOD conference proceedings, Chicago, Ill., Jun. 1–3, 1988, pp. 109–116) details five levels of array (RAIDS 1 to 5) which provide different levels of data management. Each of the RAID levels permits users to increase their data storage capacity by linking together a number of inexpensive disk drives. The RAID system provides protection against loss of data through the failure of a drive by either storing two copies of the data on two drives (RAID 1) or by striping the data across two or more drives of the array, calculating the parity for the striped data and storing the parity data on a different drive. In the event that one of the data holding drives fails, it is possible using the parity data and the remaining data of the stripe to reconstruct the data on the failed drive (RAIDs 2 to 5).

It is known that the synchronization of the spindle motors of multiple disk drives can have performance advantages in an array of disk drives in which data is striped across the drives of the array. This is because during an operation to read the data, there will be a delay in accessing the data due to rotational latency. In a single disk drive, the average rotational latency is T/2 where T is the period of rotation of the disk. For a disk rotating at 3600 RPM, the average latency is 8.3 ms.

If the disk drives of the array are unsynchronized, the average rotational latency to locate the required data once the head has arrived on the correct track will be N×T/(N+1) where N is the number of disk drives across which the data is spread. For an array of four drives, this average latency is 13 ms, with the figure increasing with an increase in the number of drives in the array. If however, the disk drives are synchronized, the average latency is reduced to the figure for a single drive thus improving the performance of the array.

To date, spindle synchronization has been achieved using two main techniques.

In a first technique, one of the disk drives is designated as the master drive and the remaining drives are designated as slave drives. Such a technique is described in U.S. Pat. No. 3,893,178 and U.S. Pat. No. 4,907,105. The master drive is responsible for the synchronization of the slave drives and achieves this by issuing 'synchronization' pulses once per revolution to each of the slave drives over a cable interconnecting the master drive and slave drives. The synchronization pulse is used by the slave drives to lock their motors to this timing. The synchronization cable is separate from the link used to interface the disk drive to the system on which commands, status and data are sent.

In a second synchronization technique, the disk drives are synchronized to an external signal provided by the controller or other means. Such a technique is described in EP 320107 where a master controller connected to five disk drives issues a spindle reference signal to each of the drives over a lead. This 'synchronizing' lead is in addition to the master channel over which data and commands pass between the controller and disk drives. At each drive, the spindle reference signal is compared with a drive index pulse produced every revolution from a mark on the disk and based on this comparison the disk drive determines whether the disk motor should be slowed down or speeded up to achieve synchronization of the reference signal and the index pulse.

The second technique described in EP 320107 has the advantage over the first technique in that synchronization is not lost in the event that the master drive should fail. However in both techniques, an extra line is required in addition to the data and command interface between disk drives and control system in order to achieve synchronization.

Although synchronization is obviously beneficial in disk array environments, there are advantages to be gained in using synchronization in a system having a single disk drive attached to a controller. If the index mark on a disk in the single drive is synchronized to a signal provided by the controller, the controller can use the knowledge of the rotational position of the disk drive gained from the synchronization, and its knowledge of the location on the disk drive of data it requires, to determine the most efficient way of accessing the data. For example, if the controller requires two blocks of data from two different locations on a disk, it can use its knowledge of the rotational position of the disk to determine which of the two blocks will be passing first under the read/write head. It can then issue the read commands for the two blocks of data in the most efficient manner.

SUMMARY OF THE INVENTION

The present invention seeks to overcome the disadvantages of the prior synchronization techniques and accordingly provides a disk drive subsystem comprising: a disk storage device having at least one data storage disk mounted for rotation on a motor driven spindle; a controller for controlling the transfer of data and command information over a communication link connecting the controller with the device, characterized by; the disk storage device including means for extracting synchronization signals, issued by the controller, from amongst the data and command information sent over the link, and means for synchronizing the rotation of the disk drive spindle to the extracted synchronization signals.

Thus synchronization is achieved in the disk subsystem of the present invention by, in effect, integrating the synchronization into the protocol used on the communication link. A disk storage device which is sent synchronizing signals over the link is able to extract these signals and synchronize the rotation of its spindle to the signals. This has the advantage over the prior art techniques in that there is no need for an additional 'sync' cable to each drive. This is especially advantageous as the number of disk drives in an array increases and the size of each drive reduces.

Although, for the reasons described above, the invention is useful when applied to the synchronization of the spindle of a single drive to a synchronizing signal issued by the controller, in a preferred subsystem, the controller is attached via the communication link to a plurality of disk drives, and each disk drive is able to detect synchronizing signals sent to it over the link from among the other data and command information. Each device synchronizes the rotation of its spindle to the synchronization signals and if the controller issued the signals to the devices simultaneously, then each spindle will be synchronized to the other spindles. In this way, the controller is able to synchronize the spindles of the attached disk drives to each other.

In a second aspect, the invention provides a method of synchronizing the spindle of a disk storage device to a synchronizing signal issued by a controller connected to the device by a communication link, wherein data and command information is transferred between controller and device over said communication link, said method comprising; extracting, at the device, said synchronization signals from amongst the data and command information sent over the communication link by the controller; and synchronizing the rotation of the spindle to the extracted synchronization signals.

In a third aspect of the invention, there is provided a data communications protocol for transferring data and command information over a communication link between the controller and a disk drive of a disk drive subsystem, the protocol comprising: data and command frames made up of a plurality of multi-bit data characters; multi-bit protocol characters for controlling the flow of frames over the link; and a special multi-bit synchronization character of pre-defined format for transmission by the controller to the disk drive over the communication link.

It will be appreciated that in common with the second prior art technique described above, the present invention has the advantage that failure of one disk drive will not affect the synchronization of the other disk drives.

In an extension of the synchronization technique of the present invention, a pair of disk drive subsystems may be attached to a using system by separate links. Using the technique of the present invention, the using system can issue synchronization signals to synchronize the timers in each controller. In this way, it is possible to synchronize individual disk drives in different subsystems.

In a further extension of this technique, a disk storage device may be connected by means of two links to two controllers. In the event that the controller issuing the synchronization signals fails, the other controller will be switched in and after a small delay begin issuing synchronization signals to the drive.

BRIEF DESCRIPTION OF THE DRAWINGS

Preferred embodiments of the invention will now be described, by way of example only, with reference to the accompanying drawings in which.

DETAILED DESCRIPTION OF THE PREFERRED EMBODIMENT

Figure 1:
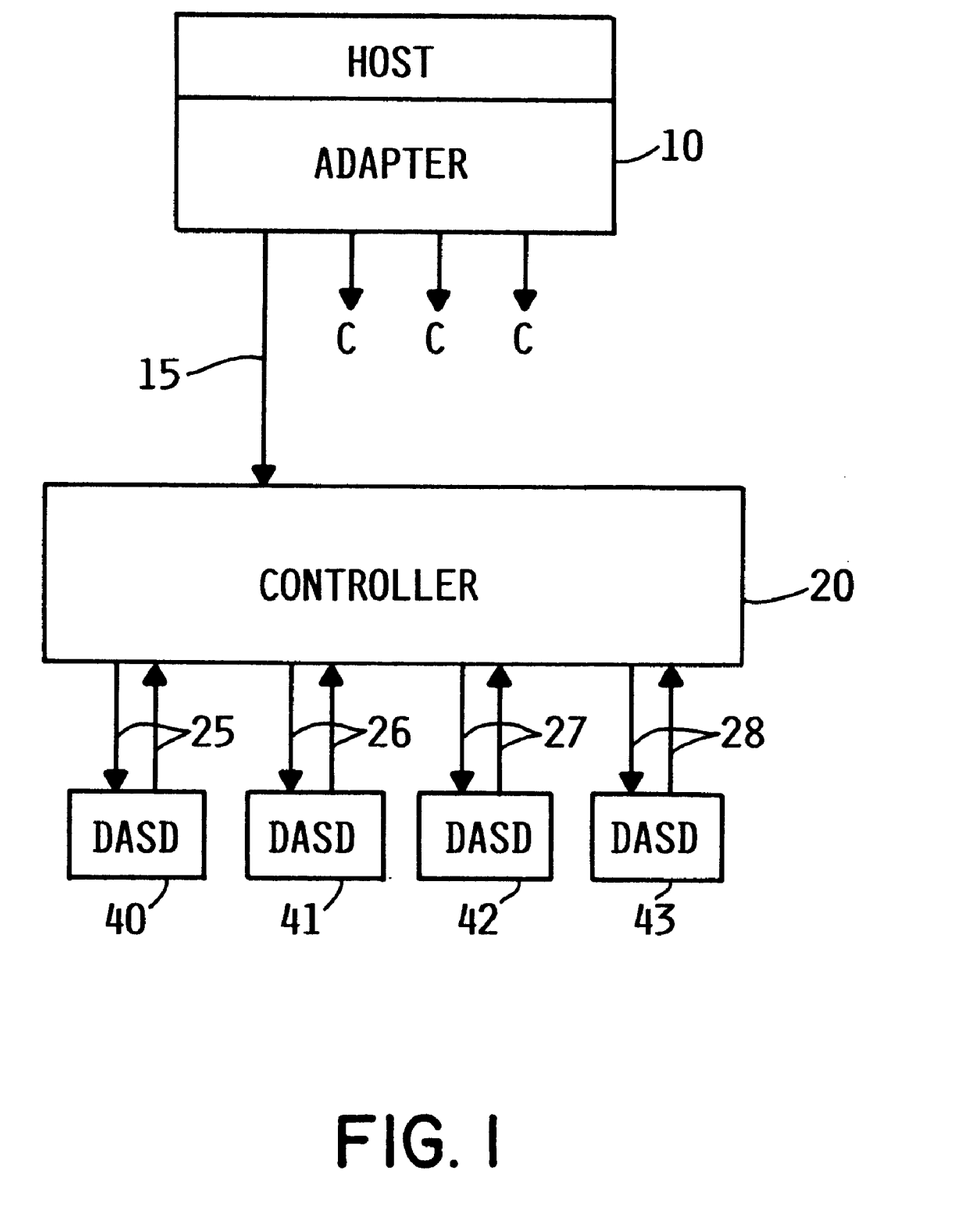
FIG. 1 shows a disk array subsystem according to the present invention including a controller connected to four disk drives.

The disk array storage subsystem of FIG. 1 comprises four disk drives 40, 41, 42 & 43 connected by means of four full duplex serial links 25, 26, 27 & 28 to a disk drive controller 20. The controller is in turn connected to a host adapter 10 by link 15 which may also be a full duplex serial link. The controller receives commands and data from the host adapter and acts on these commands to issue orders to the disk drives to control the transfer of data between the disk drive and the controller.

Figure 2:
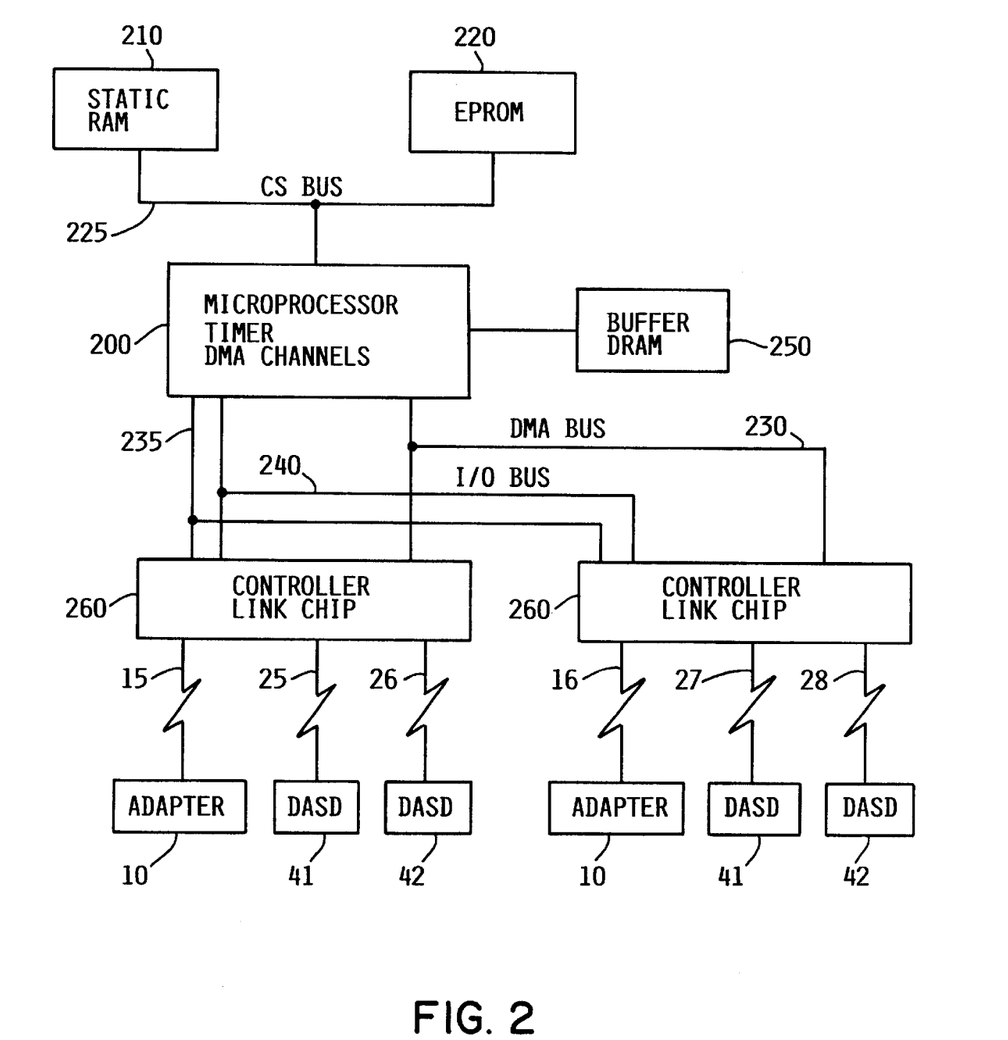
FIG. 2 is a block diagram of the main components of the controller of FIG. 1.

The main components of the controller relevant to the present invention are shown in FIG. 2. Microprocessor chip 200 performs the functions of DMA controller and also a general system controller, operating in this latter respect under the control of program code stored in the EPROM 220 and static RAM 210, both of which are connected to the microprocessor via the CS (Control Store) bus 225. The microprocessor is further connected by means of a DMA bus 230, an I/O bus 240 and a Sync bus 235 to a pair of controller link chips 260. Each controller link chip controls the operation of three serial links, two of which provide communication with to two disk drives and one of which provides communication with an attached adapter. Each serial link comprises an outbound and an inbound link (shown in FIG. 1). Data is transmitted to an attached drive over the outbound link and data is received from the disk drive over the inbound link. The microprocessor chip in its function as DMA controller controls the transfer of data by DMA in both directions between the disk drives and the buffer DRAM 250, and also in both directions between the buffer DRAM and the host adapter(s).

Figure 4:
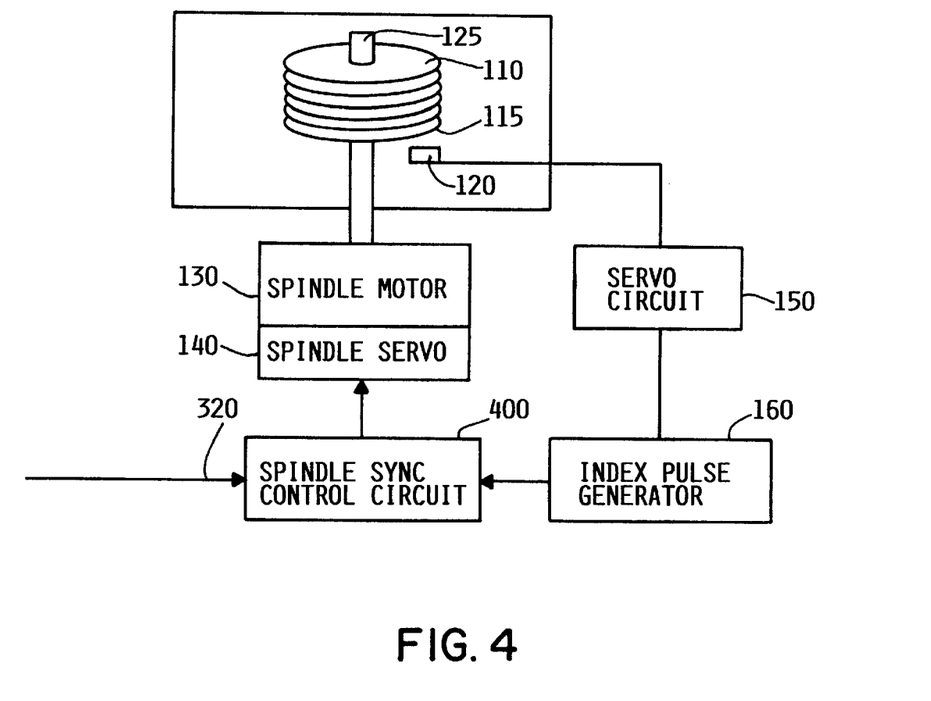
FIG. 4 is a block diagram showing the servo components of a disk drive of FIG. 1 in relation to a synchronization control circuit.
Figure 8:
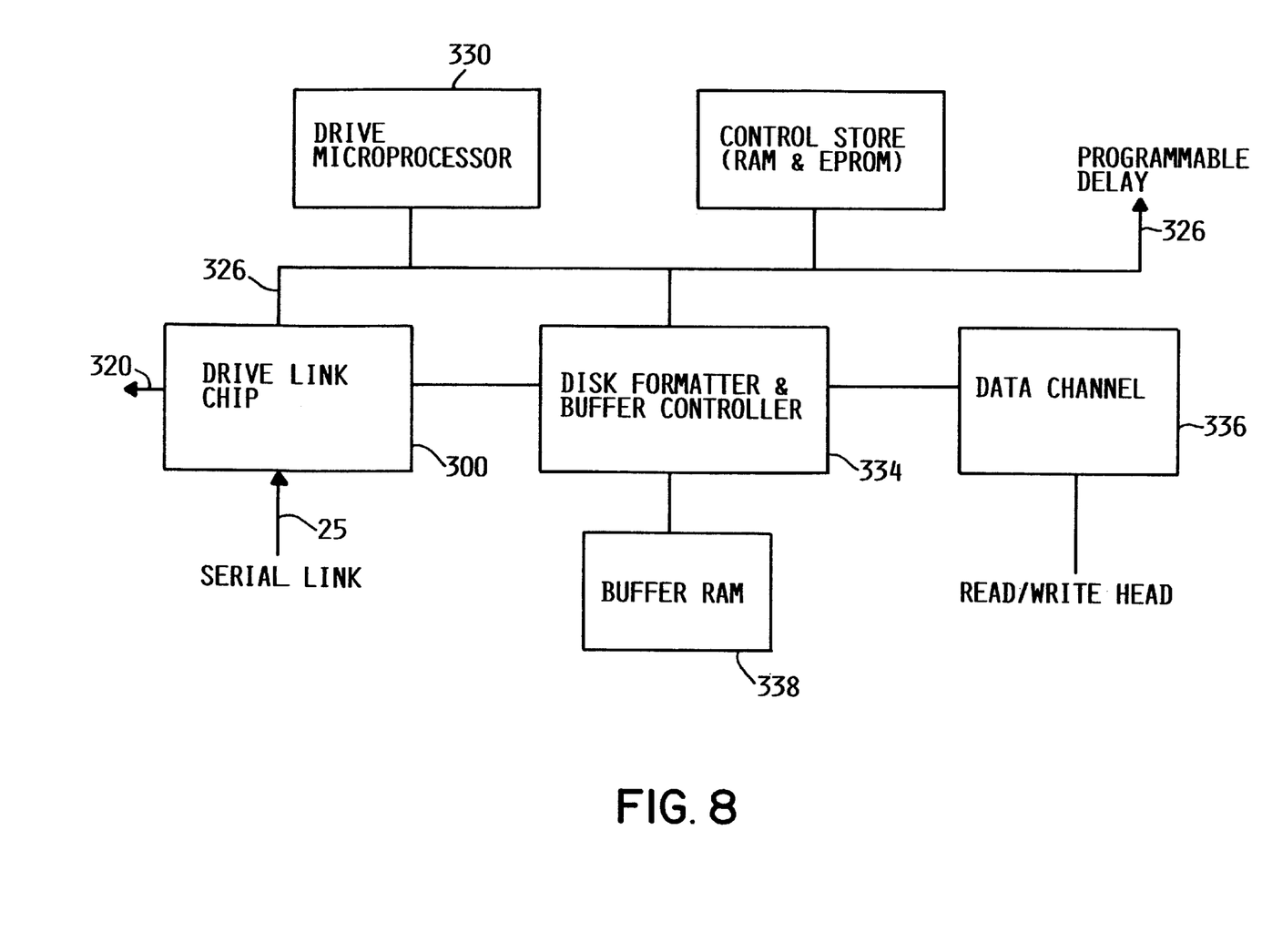
FIG. 8 is a block diagram of the main components of the disk drive logic including the drive microprocessor and drive link chip.

FIGS. 4 and 8 show, in block diagrammatical form, the main components of a disk drive relevant to the description of the present invention and their interconnection with the spindle sync control circuit 400 employed in synchronizing the disk drive spindle according to the present invention. The disk drive includes a stack of magnetic disks 110 mounted on a spindle 125 which is rotated by a spindle motor 130. Disk 115 of the stack is a dedicated servo disk including servo information which is read by dedicated servo head 120. The servo information read from disk 120 is passed to a servo control circuit 150 which uses the information in a conventional manner to control the positioning of read/write heads (not shown) with respect to the data tracks on the data disks.

During operation of the disk drive, the servo head reads an index mark on the servo disk once per revolution. An index pulse is generated on detection of the index mark by index pulse generator 160. This pulse is then passed to the Spindle Sync control circuit 400 and is used in the spindle synchronization technique of the present invention. The process of reading the index mark and generating an index pulse is well known in the art and may be carried out by means of circuitry also well known in the art. For this reason, the generation of the index pulse will not be described further.

FIG. 8 shows the components of the disk drive which correspond in general terms to the controller components shown in FIG. 2. Drive microprocessor 330 manages the operation of the other components of FIG. 8 under the control of microcode stored in control store 332 which is connected to the drive microprocessor by bus 326. During a write operation, data frames carrying write data which are sent from the attached controller are received over the inbound link of serial link 25 and loaded into buffer RAM 358 via the disk formatter and buffer controller 334. The write data is then written to disk over data channel 336. During a read operation, data is read from one of the disks and stored in buffer RAM 338 until ready for transmission over the outbound link of the serial link (not shown).

Next will be described the serial link protocol employed in the transfer of information over a serial link between the controller and an attached disk drive.

The protocol employed is a two layer protocol in which data is transferred in multi-field frames. The first layer of the protocol is a transport layer which defines the format of the frames and the means by which the flow of data is controlled. The second layer is a low level disk order set which defines the orders which are issued by the controller to the disk drives.

Figure 7:
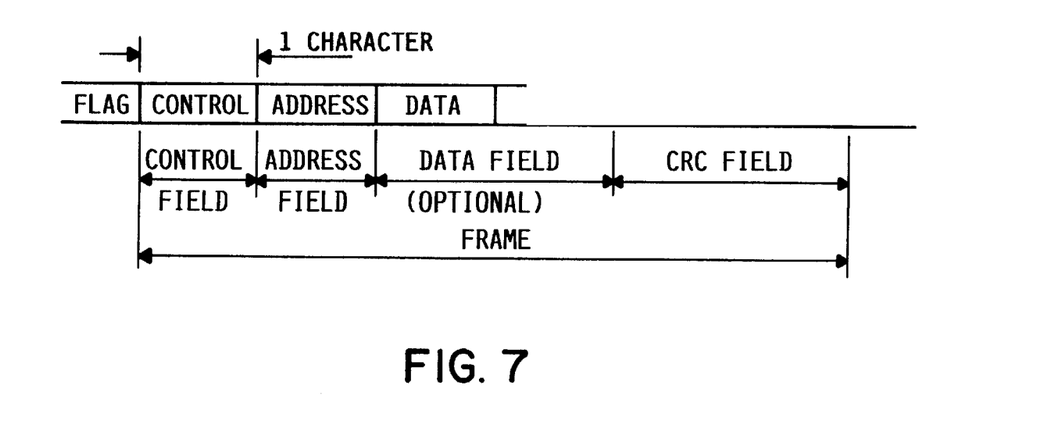
FIG. 7 shows the format of a frame employed in the communication protocol.

Beginning with a description of the transport layer protocol, eight bit data bytes and protocol functions are encoded into 10 bit characters (by means of a 8B/10B encoder 270) for transmission on the physical medium. There are 256 valid data characters which represent a byte and a much smaller number of valid protocol characters which are used, for example, to delimit frames, to provide flow control and to indicate when the serial link is in a disabled state. A frame consists of a sequence of at least four data characters which are delimited by FLAG characters at each end. The format of a frame is shown in FIG. 7 and consists of a sequence of three or four fields namely control field (1 data character), address field (1 data character), data field (optional and comprising a variable number of data characters) and a CRC field (2 data characters). The shortest possible frame, with no data field, contains four data characters.

The transport layer distinguishes two types of frames; namely, control frames and application frames. The two types of frames are used by the second layer of the protocol in different ways.

A control frame is used to, e.g., recover from link errors and to abort link orders. In one embodiment of the invention, one type of control frame is also used as a spindle synchronization signal. A control frame is distinguished from an application frame in that the most significant six bits of the control field have a non-zero value. A control frame may be sent at any time by the controller since they are not subject to the pacing rules which apply to application frames.

An application frame has all zeros in the most significant six bits of the control field and is thus distinguished from a control frame. The second layer of the protocol uses two types of application frames—message frames and data frames. The address field in an application frame specifies the address of the destination of the frame. Message frames are distinguished by a unique value in the address field.

Message frames are used to communicate between the microprocessors in the controller and the disk drive; e.g., to send orders to the disk drive and to receive status back from the drive. The format of a message frame is essentially the same as the frame format shown in FIG. 7, but in a message frame, the data field contains a message. The first byte of the data field is a code which identifies the function required and the length of the message field depends on the particular message. The various disk drive orders (e.g., READ, WRITE, etc.) make up the message field in a message frame. Each message is fully contained in a single frame. The second layer protocol defines a controller-to-device message for each order. It also defines device-to-controller messages for requesting write data and returning status.

Data frames are used to transfer data (i.e., read/write data) between the controller and the disk drive. The length of the data field is variable and a single data transfer will typically require multiple data frames.

The link protocol defines the method of transmitting frames from a source (e.g., controller) to a destination (e.g., disk drive). To implement the necessary flow control, the destination sends the source two responses for each received frame:

1. Acknowledgement—a pair of consecutive ACK protocol characters
2. Receiver Ready—a pair of consecutive RR protocol characters These protocol characters are use in pairs to protect the responses from being manufactured by transmission errors. A response is only acted on when both characters of the pair are received without any intervening characters.

In full duplex operation, the receiver may wish to send a response for a received frame while it is in the middle of transmitting another frame. In this case, the transmitter gives priority to the response and interleaves it within the frame. This scheme reduces latency and the amount of buffering required in the transmitter and receiver to sustain the full data rate of the link. Since responses consist of protocol characters, the receiver can easily separate them from the data characters that make up a frame.

The generation and transmission of frames and protocol characters will now be described with reference to FIGS. 2 and 3. Further details regarding the generation and transmission of frames and protocol characters over the link may be found in co-pending International Application PCT/GB91/00258. It should be noted that the 'frames' and 'characters' of the present invention are synonymous with the 'packets' and 'frames' respectively of the above numbered application.

Figure 3A:
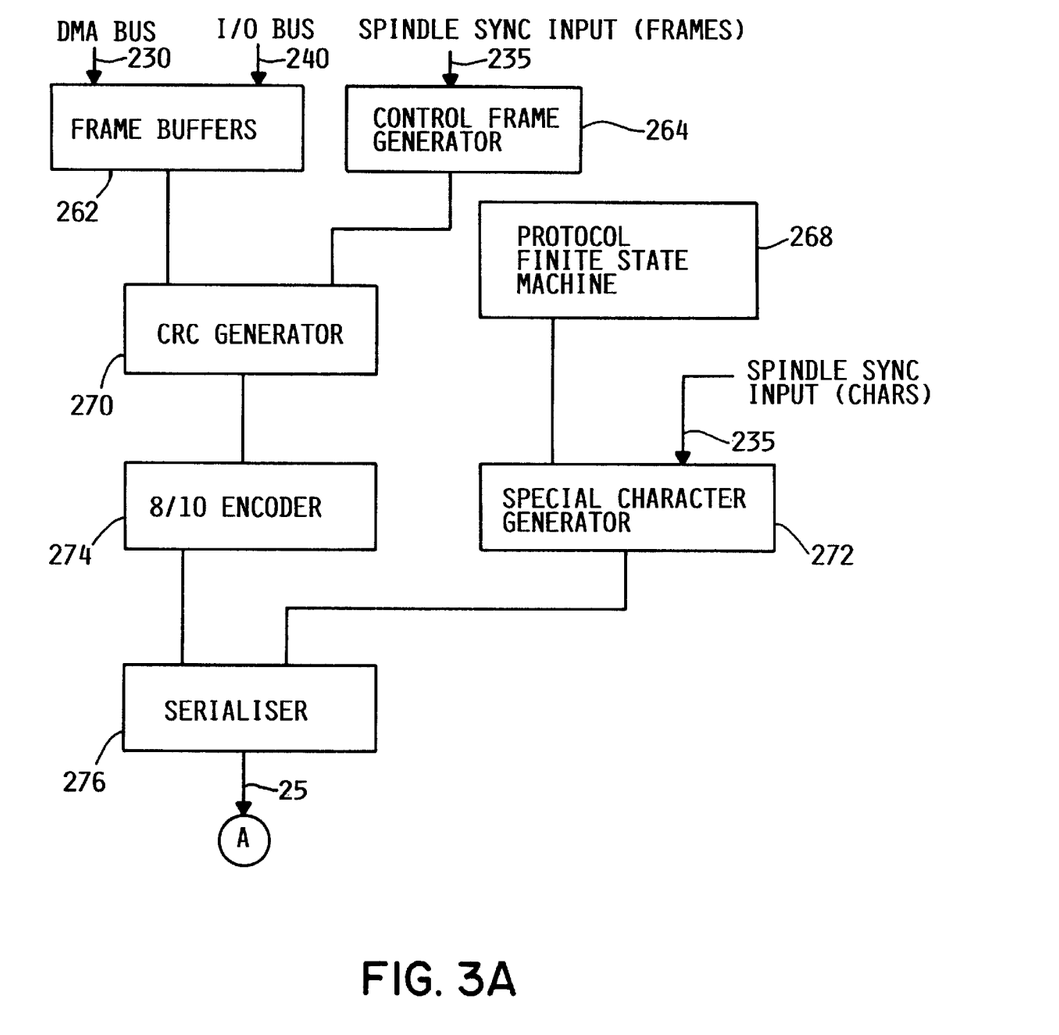
FIG. 3 is a block diagram of the main components of the outbound link portion (for one disk drive) of the controller link chip shown in FIG. 2 connected via a serial link to the inbound link portion of the corresponding drive link chip.
Figure 3B:
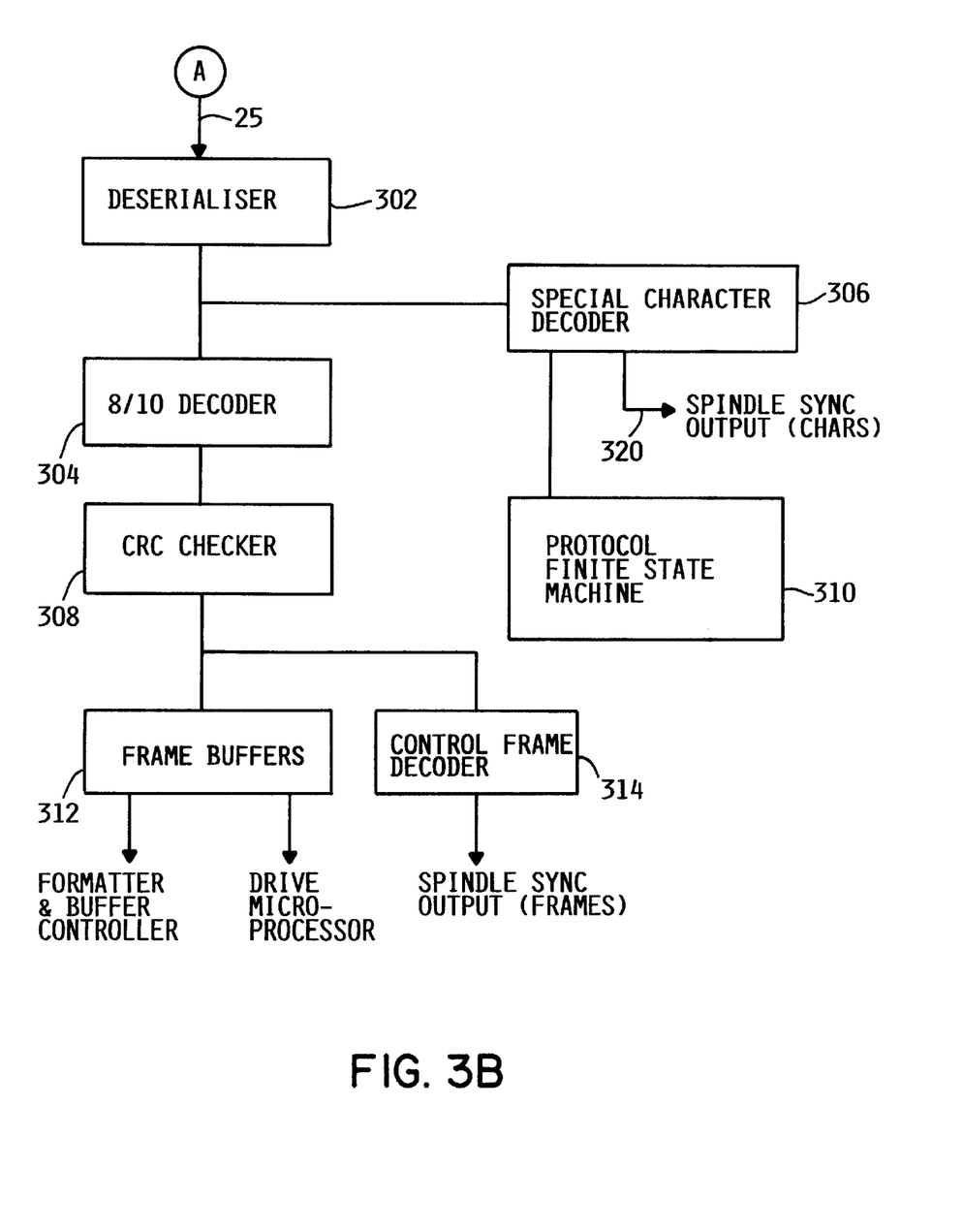

FIG. 3 shows the main functional components of one of the outbound links of the controller link chip 260 and a portion of the corresponding inbound link of a link chip 300 in an attached disk drive.

The ten bit protocol characters such as the ACK and RR characters already described are generated by protocol character generator 272 under the control of Protocol Finite State Machine 268 in response to the receipt of frames on the corresponding inbound link. The characters are serialized by serializer 276 and passed onto the outbound serial link by a link driver (not shown).

Application frames (i.e., message and data frames) are generated by the controller link chip in response to signals over the I/O bus or data sent over the DMA bus. The information (proto-frame) which ultimately makes up a frame suitable for transmission over the serial link is held in Frame Buffer 262. For each proto-frame passed from the frame buffers, CRC generator 270 calculates the CRC which is placed in two CRC characters to be included in the complete frame. Each set of eight bits in the proto-frame is encoded into a ten bit character by 8/10 encoder 274, serialized by Serializer 276 and the complete frame is passed onto the outbound link 25 by the link driver.

At the disk drive, the frames and protocol characters are deserialized by deserializer 302 and decoded by decoder 304. The protocol characters are decoded by Special Character Decoder 306 under the control of Protocol Finite State Machine 310. For example, a pair of RR characters will cause the drive to transmit a further frame of data and a pair of ACK characters will inform the drive that the previous frame has been correctly received by the controller. The disk drive is then able to delete the correctly received frame from its transmission frame buffer (not shown).

The deserialized frames are decoded by 8/10 decoder 304, the CRC is checked by CRC checker 308 to ensure the frame has not been corrupted during transmission and, if the frame is an application frame, it is held in frame buffer 312 to be passed either to the buffer RAM 338 of FIG. 8 (in the case of a data frame) or for action by the drive microprocessor 330 (in the case of a message frame).

The protocol for handling disk drive orders is as follows:

1. The controller sends an order to the disk drive in a message frame;

2. If the order requires the disk drive to transmit data (i.e., READ order) then the first parameter of the order indicates the value to be placed in the address field of the data frames. When (and if) the disk drive wishes to transfer data it sends one or more data frames with the specified value in the address field.

3. When the disk drive has sent all the required data, it sends status in a message frame to the controller.

The order set of the second layer protocol defines the orders necessary for the transfer of data between the disk drive and the controller (e.g., READ, WRITE, MOTOR START, MOTOR STOP, etc.). The order set also includes a SET POSITION order which is relevant to the present synchronization technique. The SET POSITION order defines the rotational skew position of the index mark of the drive from the controller synchronizing pulse. A value of zero indicates that the position of the drive index pulse should not be skewed from the controller synchronizing pulse. The SET POSITION order will be described in more detail below.

SPINDLE SYNCHRONIZATION

To achieve spindle synchronization using such a serial link, the controller accurately generates a signal at the frequency of the nominal rotation time of the disk drives. The synchronization signal can take one of two forms:

1. A special 10 bit protocol SYNC character. The SYNC character is similar in form to the ACK and RR protocol characters already described though obviously of a particular format which defines it as a SYNC character. A timer in controller microprocessor chip 200 issues timing signals over sync bus 235 to the controller link chip 260 at a frequency corresponding to the nominal rotation time of the disk. The timing signals pass to the special character generator 272 where the SYNC character is generated. The SYNC character is passed onto the link and to the disk drive in the manner already described. The SYNC character is decoded by Special Character Decoder 306 in the drive link chip and a SYNC signal is generated which is passed to Spindle Sync control circuit over line 320.

In a preferred technique, the character generator 272 generates a pair of SYNC characters. The disk drive will then only act on the SYNC characters when both have been received. This ensures that the synchronization is not incorrectly initiated on receipt of a corrupted character. Because the SYNC signal is one of the special protocol characters, it may be interleaved within a frame being transmitted over the link. The transmission of a SYNC character may be delayed until a pair of other protocol characters; e.g., RR or ACK, have been transmitted but they are not delayed by any other link activity.

2. Alternatively, the synchronization signal can take the form of a Spindle Sync control frame (SS frame); i.e., a control frame in which a Spindle Sync bit in the control field is set. An SS frame is generated in the Controller Link Chip 260 by the control frame generator 264 in response to a timing signal sent by the microprocessor over Sync Bus 235. The SS frame is then passed onto the serial link in the same manner has already been described for Application frames and is received by drive link chip 300. As with an application frame, the SS frame is deserialized, decoded by 8/10 decoder 304 and checked by CRC checker 308. The SS frame is identified as an SS frame by the control frame decoder 314 which issues a synchronizing signal over line 320 to the Spindle Sync Control Circuit 400.

This implementation is less accurate than when a special SYNC character is used on the link because if another frame is being transmitted by the controller at the time an SS frame should be sent, then the transmission of the SS frame is delayed until the current frame transmission has ended. However, it could in some circumstances be desirable to restrict the use of special characters on the link to those required for link protocol and not for transmitting control information including synchronization signals.

The SYNC protocol character implementation will be used as the basis for the remainder of this description.

Figure 5:
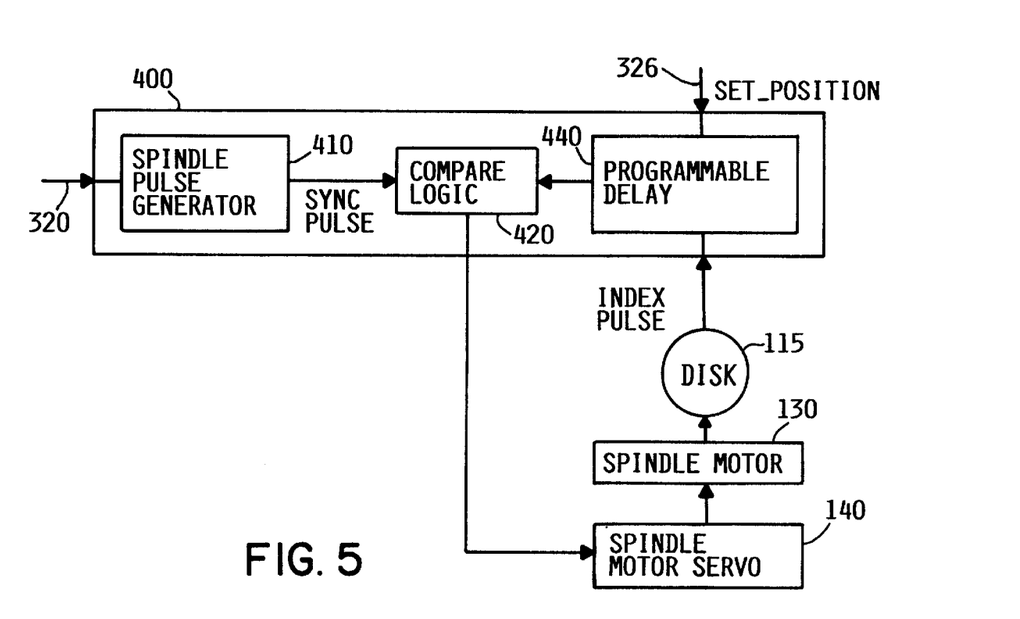
FIG. 5 is a block diagram of the synchronization control circuit of FIG. 4.

When the disk drive link chip detects the receipt of a pair of SYNC characters at the Spindle Sync detector 306, it issues a signal to Spindle Sync control circuit 400 in the drive where a SYNC pulse is generated by Spindle Sync pulse generator 410. The SYNC pulse is then compared with the index pulse produced from the index mark on the servo disk and the comparator 420 determines whether the index pulse is leading or lagging the SYNC pulse and from this determination calculates whether the spindle motor needs to be speeded up or slowed down. The result of this calculation is passed to the spindle motor servo 140 which controls the speed and phase of the spindle motor relative to the index pulse. Assuming that the index pulse was not coincident with the SYNC pulse, the spindle motor servo alters the speed of the motor to cause the disks to rotate faster or slower. On receipt of the next SYNC pulse, the Spindle Sync control circuit will re-calculate the phase difference between the index pulse and SYNC pulse and, if necessary, issue a further signal to the Spindle Motor Servo 140. The process continues until the SYNC pulses and index pulses are locked in synchronization.

The speed of the spindle motor can be accurately controlled so that the variation from a fixed reference timing provided by the speed reference logic can be within plus or minus 0.1%. This is approximately plus or minus 10 microseconds for high performance disk drives. If SYNC characters are employed as the synchronizing signals, the delay in issuing SYNC characters due to other link activity will be about 0.2 microseconds, assuming a link speed of 10 MBytes/sec.

If, however, the Spindle Sync control frames are used as the synchronizing signals then the reference timing to the motor control will jitter depending on the hold-off due to current link activity (i.e., whether a frame is currently being transmitted by the controller). If the link speed is 10 Mbytes/sec and data is transferred in 64 byte frames, the maximum hold-off for the synchronizing control frame is about 7 microseconds. In some circumstances, this hold-off might make the control frame option undesirable. However, in other circumstances where the variation in speed is not so critical, the advantage of the Spindle Sync control frame in that there is no need to define a special protocol character could outweigh the disadvantage caused by the larger hold-off.

In order to synchronize the rotational positions of the disk drives of the array, the controller issues timing signals to both controller link chips which then issue synchronizing signals to the attached disk drive over the serial link. For example, if it is desired to synchronize the rotations of all four drives shown in FIG. 1, synchronizing signals will be generated and transmitted by four outbound link portions of the controller link chip as illustrated in FIG. 3. Four drive link chips as shown in FIG. 3 will receive and decode the synchronizing signals.

SKEWING

The synchronization technique of the present invention also provides the ability to skew the rotation of the spindle to the synchronizing signal from the controller. The index mark of the disk drive can be skewed from the SYNC character by an amount specified in the SET POSITION order to the disk drive. This permits different disk drives on the system to be offset from each other. For example, a mirrored pair of disk drives (i.e., a pair of drives, each holding a copy of the same data) could be positioned 180 degrees out of phase to minimize the latency to locate the required data from either of the drives.

The controller forms a message frame including a SET POSITION order in the data field and sends this to a selected drive or drives where it is held in Frame Buffer 312 for action by the Drive microprocessor. The skew value in the SET POSITION order is read by the Drive Microprocessor 330 and the value is loaded into programmable delay 440 via microprocessor bus 326. The index pulse from the disk is passed through the programmable delay which delays the transmission of the pulse to the comparator circuit by an amount specified in the SET POSITION order. The phase difference between the index mark and the receipt of the SYNC character from the controller can thus be set to any value by the SET POSITION order.

Figure 6:
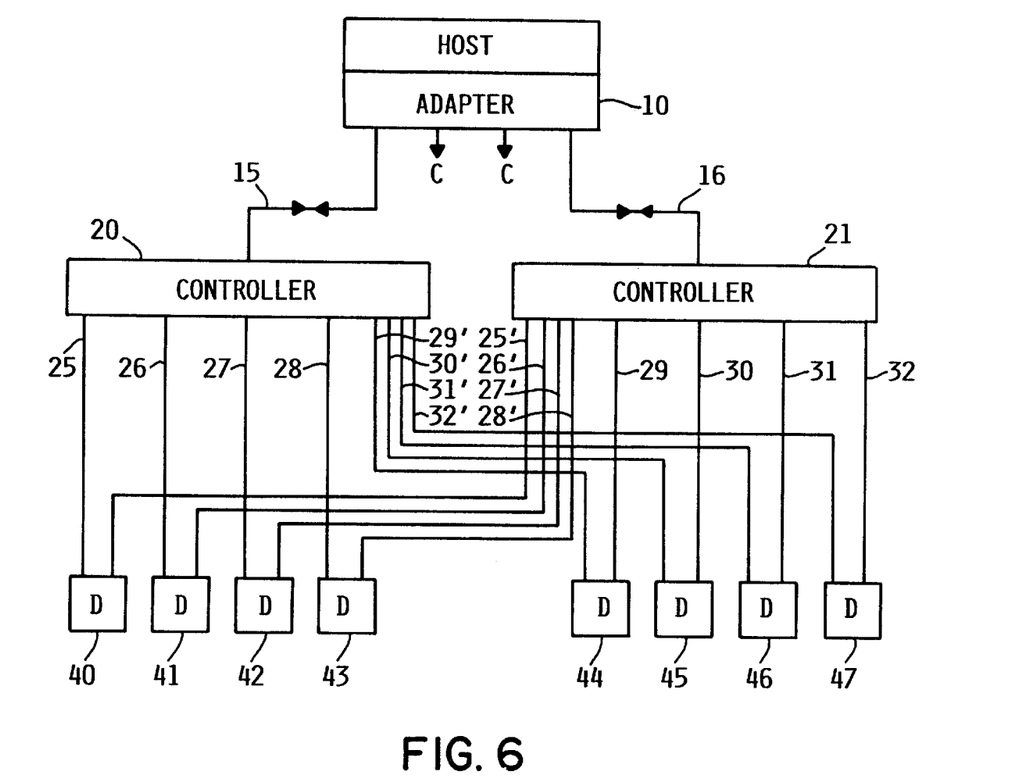
FIG. 6 is a block diagram showing a system configuration including a pair of controllers connected to a pair of disk arrays.

In the above description, each disk drive is attached via a dedicated serial link to a single controller. In an extension of the technique of the present invention, each disk drive may be attached to multiple controllers by means of multiple serial links. Such a configuration, attaching two controllers, is shown in FIG. 6 wherein the disk drives (40,41,42,43) of a first array are attached to controller 20 by means of serial links 25, 26, 27 & 28 and to controller 21 by serial links 25', 26', 27', & 28'. Similarly, disk drives 44, 45, 46 & 47 are attached to controller 21 by serial links 29, 30, 31 & 32 and to controller 20 by serial links 29', 30', 31'& 32'. In operation, if controller 20 which is issuing SYNC characters to disk drives 40, 41, 42 & 43 fails, then the disk drives are reserved by controller 21 which will begin transmission of SYNC characters to the drives over the interconnecting links. Synchronization can thus be maintained after an interval when one controller fails. Similarly, if controller 21 fails, then controller 20 can take over the synchronization of disk drives 44, 45, 46 and 47.

The synchronizing technique described above may be implemented at a higher level. In the configuration of FIG. 6, controllers 20 and 21 are attached to the using system by dedicated serial links similar to those as have been described for attaching the disk drives. The adapter would be able to issue synchronizing commands to both controllers which would cause the timers in each of the controller microprocessors to be synchronized. In this way, all eight (or fewer) of the disk drives attached to the synchronized controllers may then be synchronized with each other.

It will be appreciated that the present technique allows the controller to synchronize a subset of the attached disk drives. For instance, it may be desirable to synchronize a pair of the four drives with their index marks in phase with each other and to synchronize the second pair with their index marks 180 degrees out of phase with one another.

In the configuration of FIG. 6, if a single drive were to fail, it would be possible for the attached controller to switch in a disk drive (hot spare) from the set of drives attached to the second controller. In this way, the performance of the array would not be affected in the event of failure of one of the drives. Thus, an array may be dynamically configured from a pool of devices and synchronization maintained when any device fails. This allows spare disk drives to be configured into an array dynamically when one device fails.

The controller originates the synchronizing timing pulses that are used by each drive to synchronize its motor. Therefore, if the controller knows the physical organization of data blocks on the disk and their position relative to this synchronization pulse, it can have knowledge of the rotational position on all the disk drives of the required data. This can be used to determine which drive to read of a mirrored pair that have been positioned 180 degrees out of phase, and so minimize the latency in locating the required data.

While the above description has been directed to the synchronization of disk drives connected to a controller via dedicated serial links, it will be apparent that the concept of the present invention is also applicable to parallel interfaces provided the interface allows synchronization signals to be sent without excessive delay.

What is claimed is:

1. A disk drive subsystem comprising:
    at least one disk storage device, each disk storage device having at least one data storage disk mounted for rotation on a motor driven spindle;
    a controller for controlling the transfer of data and command information over a communication link connecting the controller with each said disk storage device, said data and command information being transmitted over said communication link in the form of frames comprising a plurality of multibit data characters;
    means in each said disk storage device for extracting synchronization signals, issued by said controller in the form of at least one multibit SYNC character of predefined format, from amongst the data and command information sent over said communications link, said synchronization signals and said data and command information being transmitted over the same communication link, said multibit SYNC character being transmitted within one of said frames of said data information and interleaved between multibit data characters of the one frame; and
    means in each said disk storage device for synchronizing the rotation of the motor driven spindle to the extracted synchronization signals.

2. A disk drive subsystem comprising:
    at least one disk storage device, each disk storage device having at least one data storage disk mounted for rotation on a motor driven spindle;

a controller for controlling the transfer of data and command information over a communication link connecting the controller with each said disk storage device, said data and command information being transmitted over said communication link in the form of frames comprising a plurality of multibit data characters;

a special character decoder in each said disk storage device for extracting synchronization signals, issued by said controller in the form of at least one multibit SYNC character of predefined format, from amongst the data and command information sent over said communications link, said synchronization signals and said data and command information being transmitted over the same communication link, said multibit SYNC character being transmitted within one of said frames of said data information and interleaved between multibit data characters of the one frame; and a spindle sync control circuit in each said disk storage device for synchronizing the rotation of the motor driven spindle to the extracted synchronization signals.

3. A disk drive subsystem as claimed in claim 2, wherein said disk drive subsystem comprises at least two disk storage devices, the rotations of the spindles of each of the disk drives being synchronized with respect to one another.

4. A disk drive subsystem as claimed in claim 3, wherein:

a data storage disk of each said disk storage device includes an index mark; and said controller issues skew signals over the communication link to selected ones of the disk storage devices to cause the index mark of a first disk storage device to be out of phase with the index mark of a second disk storage device by an amount specified in the skew signal.

5. A disk drive subsystem as claimed in claim 3, wherein the communication link is a dedicated point to point serial link between the controller and each of the disk storage devices.

6. A disk drive subsystem as claimed in claim 5, further comprising a second controller connected to each of the plurality of disk storage devices by means of a second point to point serial link.

7. A disk drive subsystem as claimed in claim 2, wherein the synchronization signals take the form of a pair of multibit SYNC characters of predefined format.

8. A disk drive subsystem as claimed in claim 7, wherein no intervening multibit data characters of the one frame are between said pair of multibit SYNC characters.

9. A disk drive subsystem as claimed in claim 2, wherein the synchronization signal is issued by the controller at the frequency of the nominal rotation time of the disk storage device spindle.

10. A method of operating a disk storage device connected to a controller by a communication link, wherein data and command information is transferred between controller and device over said communication link in the form of frames comprising a plurality of multibit data characters, said method comprising the steps of:

generating, at the controller, a plurality of synchronization signals each in the form of at least one multibit SYNC character of predefined format;

transmitting said plurality of synchronization signals from said controller to said disk storage device over said communication link;

transmitting data and command information from said controller to said disk storage device over said communication link, at least one said multibit SYNC character being transmitted within one of said frames of said data information and interleaved between multibit data characters of the one frame;

extracting, at the disk storage device, said synchronization signals from the data and command information sent over the communication link by the controller; and synchronizing the rotation of the spindle to the extracted synchronization signals.

11. A method as claimed in claim 10, wherein a plurality of disk storage devices are connected to the controller by the communication link, each storage device extracting synchronizing signals from the data and command information sent to the device by the controller and synchronizing the rotation of the device spindle to the extracted synchronization signals, whereby the spindles of each of the storage devices are synchronized with respect to one another.

12. A disk storage device for storing data, comprising:

at least one data storage disk mounted for rotation on a motor driven spindle;

said disk storage device communicating with a controller over a communication link linking said disk storage device with said controller, the communications between said disk storage device and the controller transmitted on the communication link comprising data and command information in the form of frames comprising a plurality of multibit data characters;

a special character decoder for extracting synchronization signals, issued by said controller in the form of at least one multibit SYNC character of predefined format, from among data and command information sent over said communication link, said synchronization signals and said data and command information being transmitted over the same communication link, said multibit SYNC character being transmitted within one of said frames of said data information and interleaved between multibit data characters of the one frame; and a spindle sync control circuit for synchronizing the rotation of the motor driven spindle to the extracted synchronization signals.

13. The disk storage device of claim 12, wherein the synchronization signals take the form of a pair of multibit SYNC character of predefined format.

14. A disk storage device as claimed in claim 13, wherein no intervening multibit data characters of the one frame are between said pair of multibit SYNC characters.

* * * * *